United States Patent [19]

Offenberg et al.

[11] Patent Number: 5,310,450

[45] Date of Patent: May 10, 1994

[54] METHOD OF MAKING AN ACCELERATION SENSOR

[75] Inventors: Michael Offenberg, Tuebingen; Martin Willmann, Reutlingen, both of Fed. Rep. of Germany

[73] Assignee: Robert Bosch GmbH, Stuttgart, Fed. Rep. of Germany

[21] Appl. No.: 900,187

[22] Filed: Jun. 17, 1992

[30] Foreign Application Priority Data

Jul. 6, 1991 [DE] Fed. Rep. of Germany ....... 4122435

[51] Int. Cl.[5] ..................... H01L 21/306; B44C 1/22; C03C 15/00
[52] U.S. Cl. ..................... 156/630; 156/633; 156/651; 156/657; 156/662; 148/DIG. 159; 437/901; 437/921
[58] Field of Search ............... 156/629, 630, 633, 647, 156/651, 657, 659.1, 662; 73/517 R; 437/901, 921; 148/DIG. 159

[56] References Cited

U.S. PATENT DOCUMENTS

| | | | |
|---|---|---|---|
| 4,851,080 | 7/1989 | Howe et al. ................... | 156/657 X |
| 5,095,752 | 3/1992 | Suzuki et al. .................. | 73/517 R |
| 5,169,472 | 12/1992 | Goebel ........................ | 437/901 X |

OTHER PUBLICATIONS

Roy Lance et al., A Batch-Fabricated Silicon Accelerometer, IEEE Transactions on Electron Devices, vol. ED-26, No. 12, Dec. 1979.

Theresa Lober & Roger Howe, "Surface Micro-Machining Processes for Electrostatic Microactuator Fabrication," 1988, IEEE Publication THO215-4/88/0-00-0059.

Masaru Shimbo et al./Toshiba, "A Newly Developed Silicon to Silicon Direct Adhesion Method,", Jour. of the Electrochemical Society, Extended Abstracts vol. 86-1, p. 337, 1986.

*Primary Examiner*—William A. Powell
*Attorney, Agent, or Firm*—Frishauf, Holtz, Goodman & Woodward

[57] ABSTRACT

A method of making acceleration sensors with integrated measurement of internal pressure includes connecting multiple plates to each other, thereby defining internal cavities. The tightness of these connections or bonds is checked and controlled during the manufacturing process. The plates define membrane portions adjacent each cavity, the membranes deforming in accordance with the internal pressure in the adjacent cavity. Preferably, the internal pressure of the sensor is measurable by detecting deformation of a sensor wall which defines a membrane.

8 Claims, 2 Drawing Sheets

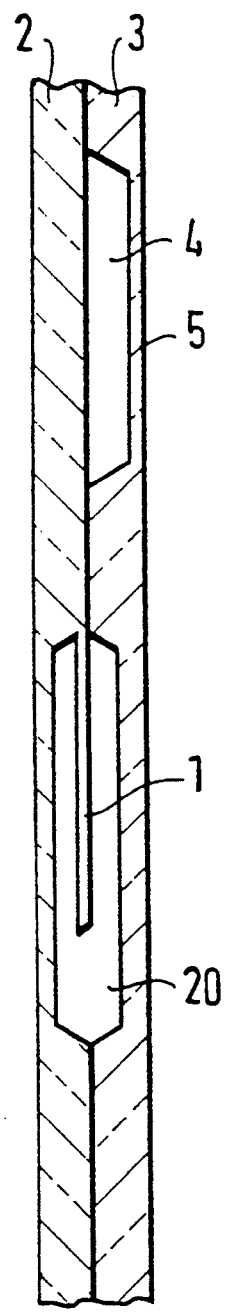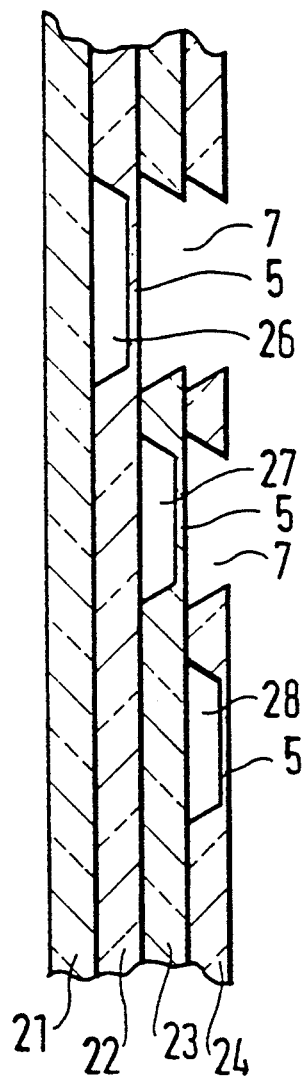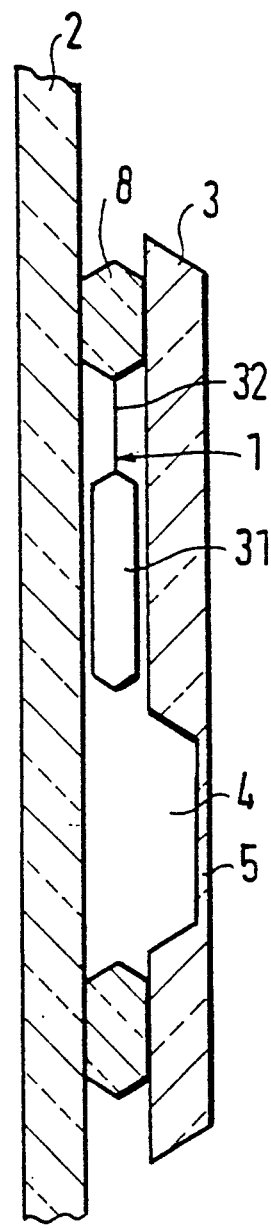

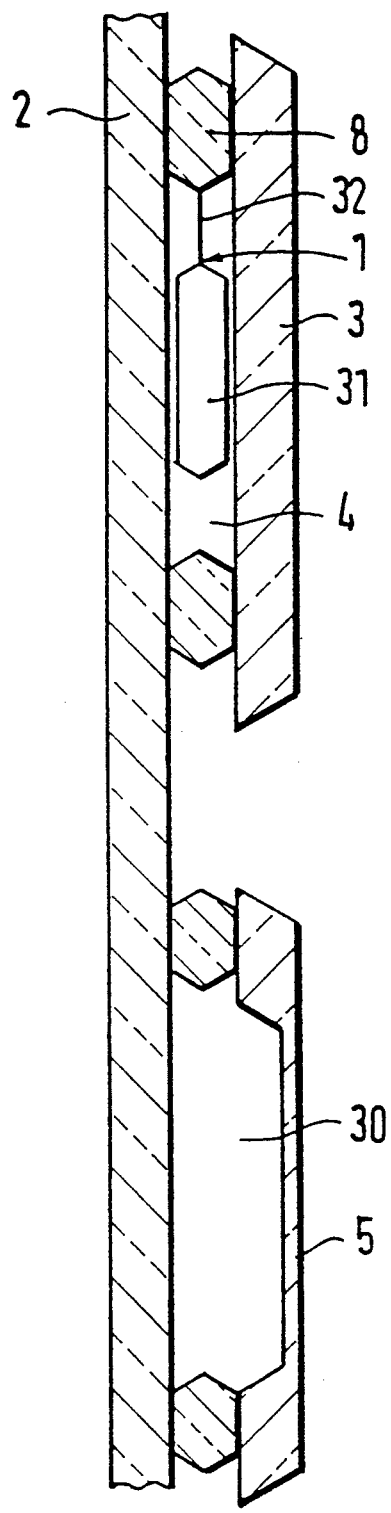
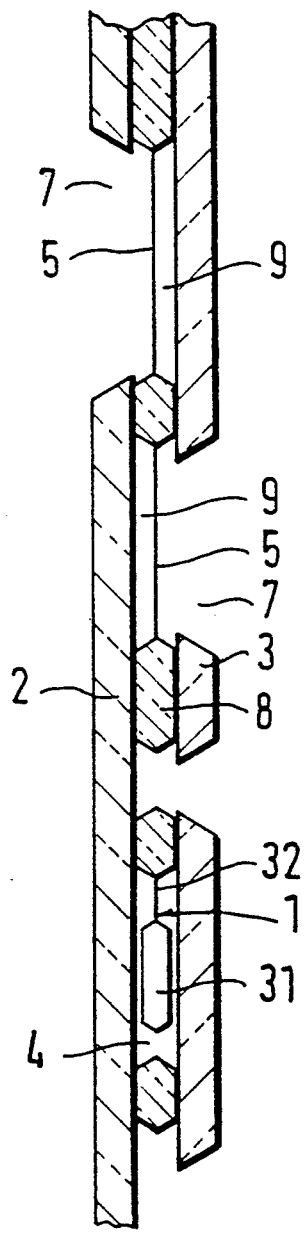

METHOD OF MAKING AN ACCELERATION SENSOR

CROSS-REFERENCE TO RELATED PATENTS AND APPLICATIONS, THE DISCLOSURES OF WHICH ARE INCORPORATED BY REFERENCE

U.S. Pat. Nos. 4,522,067 and 4,620,365, BURGER.
U.S. Pat. No. 5,005,414, HOLLAND et al. (=DE-OS 38 14 950)
U.S. Pat. No. 4,955,234, MAREK, issued Sep. 11, 1990=DE 38 14 952;
U.S. Pat. No. 5,071,510 FINDLER & MUENZEL, issued Dec. 10, 1991, corresponding to German P 39 31 590.9 of 22 Sep. 1989 and German application P 40 02 472.0 of 6 Feb. 1990;
U.S. Ser. No. 07/631,623, MAREK, BANTIEN, HAACK & WARTH, now U.S. Pat. No. 5,161,763, corresponding to German Patent DE-PS 40 00 903 of 9 Aug. 1990;
U.S. Ser. No. 07/716,817 MAREK filed Jun. 17, 1991, refiled Jan. 4, 1992 as Ser. No. 893,900 corresponding to German P 40 22 464.3, filed Jul. 14, 1990;
German Patent Disclosure DE 36 09 841, filed Mar. 22, 1986, and Published International Application WO 87-05569, HEINTZ et al;
ENGELSDORF & METTNER, German Patent Disclosure DE-OS 39 19 876, publ. Dec. 20, 1990, and corresponding PCT/DE90/00366, publ. Dec. 27, 1990 as WO 90-15933, whose U.S. national phase is U.S. Pat. No. 5,161,774;
U.S. Ser. No. 07/566,997, METTNER et al., filed Aug. 13, 1990, now U.S. Pat. No. 5,142,781, and corresponding PCT/EP90/01297, publ. as WO 91-02169;
German patent Disclosure P 40 00 496.1, MAREK et al., and corresponding PCT/DE 90/00596, publ. 7 Mar. 1991 as WO 91/03074;
German Patent Disclosure P 40 12 071.6, filed 14 Apr. 1990, and corresponding PCT/DE 91/00264, filed 23 Mar. 1991, TRAH, METHOD OF MAKING MICROMECHANICAL STRUCTURES;
German Patent Disclosure DE 40 16 471.3 and corresponding U.S. Ser. No. 07/701,781, BANTIEN, filed May 17, 1991, now U.S. Pat. No. 5,148,604;
German Patent Application P 40 22 495.3, filed July 1990.

CROSS-REFERENCE TO RELATED LITERATURE

Walter Kern, "Chemical Etching of Silicon, Germanium, Gallium Arsenide, and Gallium Phosphide", RCA REVIEW, June 1978, Vol. 39, pp. 278-308;
M. Shimbo et al, "A Newly Developed Silicon-to-Silicon Direct Adhesion Method," Journal of the Electrochemical Society, Vol 86-1, Extended Abstract No. 232, 1986;
Theresa Lober & Roger Howe, "Surface-Micromachining Processes for Electrostatic Microactuator Fabrication,"; IEEE publication THO215-4/88/0000-0059, copyright 1988.

FIELD OF THE INVENTION

The present invention relates generally to acceleration sensors and, more particularly, to a sensor produced by forming an internal cavity in a semiconductor structure.

BACKGROUND

European Patent Application 0 369 35 A1 and corresponding U.S. Pat. No. 5,095,752 of 17 Mar. 1992, SUZUKI et al./HITACHI, disclose various method for connecting structured silicon plates with glass plates, with or without auxiliary layers. This involves connecting or bonding the silicon plates airtightly together, so that the enclosed sensor element undergoes no contact with the outer or ambient air.

THE INVENTION

Making the structure with an internal cavity and an adjacent membrane which is deformable, according to the pressure in the cavity, has the advantage that the tightness of the bond or seal between various plates can be checked immediately after the connection or bond is made. Particularly during parallel manufacture of multiple sensors on a single wafer, it is greatly advantageous if this check is possible at an early stage of the manufacture, and without additional processing of the wafer. Further, the method of the present invention permits assessment of the effect of each subsequent processing step, on the connection of the plates and on the internal pressure of the sensors. When a sensor has a membrane, the internal pressure of each sensor is measurable at any time, even after separation into individual sensors.

In the course of connecting multiple plates for making sensors, the method of the present invention permits a desirable localization of faulty or mismade bonds or connections between plates. If the cavities are formed to extend adjacent several plates, an assessment of the seals or bonds of all participating plates is made possible.

The advantage of having one membrane for each sensor is that it permits individual assessment of each individual sensor. Conversely, the assessment of multiple sensors by means of a single cavity, arranged adjacent multiple ones of the sensors, and associated with a single membrane, is that less chip surface is required, which is therefore more cost-effective.

The use of masking and etching processes permits the parallel manufacture of a multiplicity of sensors. From a mass production standpoint, the use of a three-plate structure is advantageous, with the sensor element made from a middle plate. Implementing the membranes in the middle plate is cost-effective because the processes for making the sensor element are also used for making the membranes.

When sensors have a membrane, the internal pressure of the sensors can be monitored at any time. It is particularly advantageous to arrange the membranes spatially next to the sensor elements, in order that the movement of the sensor elements is not hindered by the deformation of the membrane.

BRIEF DESCRIPTION OF THE DRAWINGS

FIG. 1 is a section through two connected plates;
FIG. 2 is a section through four connected plates;
FIG. 3 illustrates a sensor whose sensor element has been formed from an intermediate plate;
FIG. 4 illustrates a sensor with a cavity located next to the sensor; and
FIG. 5 illustrates an advantageous arrangement of the membranes of three plates.

DETAILED DESCRIPTION

FIG. 1 illustrates a lower plate 2 and an upper plate 3, which have been so processed and assembled that cavities 4, 20 have been created. Upper plate 3 features at least one cavity 4 formed by etching of the upper plate. This renders upper plate 3 so thin that it is deformable as a membrane.

The sensor element 1 is hermetically encapsulated in a further cavity 20. Both plates 2,3 can be made of a monocrystalline material such as silicon, gallium arsenide, germanium or quartz, but amorphous materials such as glass are also usable.

The connection of the two plates 2, 3 is made by silicon-direct-bonding, by anodic bonding, adhesion, welding or soldering. The processing of the plates is typically accomplished by etching processes such as reactive ion etching, or anisotropic or isotropic chemical etching processes, but one can also use mechanical processing and various methods for slicing off thin films.

Typically, the micromechanical sensor elements 1 are hermetically separated from the ambient environment, in order to avoid soiling, or damaging contacts. Therefore, it makes sense to seal the sensors with an interior pressure which differs from normal atmospheric pressure. In particular, encapsulation with sub-atmospheric pressure is advantageous because it reduces frictional effects between the movable sensor elements and the air. Membrane 5 is so dimensioned that it becomes deformed as a result of a pressure difference between cavity 4 and the surroundings. The detection of deformation of the membrane can be accomplished, for example, by optical or mechanical measurement. The measurement of this deformation permits a statement or determination as to the pressure prevailing within cavity 4. Thus, it is possible to make a determination as to the pressure in the acceleration sensors, without the wafer being subdivided, contacted, or further processed in any way.

FIG. 2 illustrates four plates 21-24 with three cavities 26-28 and membranes 5. Above the membrane 5 of cavity 26, plates 23 and 24 are provided with openings 7. Above the membrane of cavity 27, plate 24 is provided with another opening 7. Through these openings 7, one can detect, by deformation of each membrane 5, the internal pressure in each individual cavity and thus the tightness or seal quality of the respective connections among the three plates. Cavity 26 permits assessment of the connection between plates 21 and 22, cavity 27 permits assessment of the connection between plates 22 and 23, and cavity 28 permits assessment of the connection between plates 23 and 24. The principle, of checking each individual connection between two plates using cavities and superposed openings, shown in FIG. 2 for four plates 21-24, can be extended in an equivalent manner to a structure with an arbitrarily large number of plates.

FIG. 3 illustrates an acceleration sensor formed by the connection of a lower plate 2, a middle or intermediate plate 8, and an upper plate 3. The sensor element 1, which in the embodiment shown features a tongue 32 and a seismic mass 31, is made from intermediate plate 8, consisting essentially of silicon or another monocrystalline material, by etching processes. Upper plate 3 and lower plate 2 pressure-tightly enclose sensor element 1. A membrane 5 is worked from upper plate 3 by etching processes from a monocrystalline material or glass. The trapped or enclosed pressure and the quality of the connection of the plates is specified or evidenced by the excursion or displacement of this membrane 5. Spatially, membrane is located or arranged next to or beside sensor element 1, rather than directly adjacent. This feature assures that the excursion or displacement of membrane 5 does not disturb the movement of sensor element 1.

FIG. 4 illustrates another embodiment of the acceleration sensor, which again is made by connection of three plates 2,8,3, and has a separate cavity 30 located to the side of sensor 1. The manufacture of sensor element 1 is accomplished in a known manner, and for the manufacture of cavity 30, etching processes on middle or intermediate plate 8 are so carried out that, in the area of cavity 30, middle plate 8 is completed removed. Upper plate 3 retains, adjacent sensor element 1, essentially its original thickness, but adjacent cavity 30 is partially a membrane 5. The excursion of membrane 5 of cavity 30 permits an indirect statement or determination of the pressure enclosed in cavity 4 of the sensor.

A particularly cost-effective mass production is the parallel creation of many sensors, often a hundred sensors, by connecting together only three processed wafers. For processing of the wafers, the only methods used are those which simultaneously work on all sensors, e.g. etching techniques and masking techniques. For the parallel manufacture of a multiplicity of acceleration sensors by assembly of wafers, it is often sufficient to determine the quality of the connection using a few cavities located next to the sensors, with one membrane. The cavity shown in FIG. 4 is defined by all three of the plates used in the manufacturing process. The excursion of the membrane thus evidences the tightness or seal quality of a single connection, but rather the tightness of two connections accomplished during the manufacturing process. In the case of manufacturing processes with more than 3 plates, the quality of all the connections can be determined in equivalent fashion, using corresponding cavities.

FIG. 5 illustrates a further refinement of the invention, as used in making sensors by assembly of three plates 2,8,3. The manufacture of sensor element 1 is carried out in known fashion. Next to the sensor are arranged two additional or supplemental cavities 9. Middle plate 8 is, in the region of these additional cavities 9, formed by corresponding etching processes partially as a membrane. Upper plate 3 is provided with an opening 7 adjacent one of cavities 9, while lower plate 2 is provided with an opening 7 adjacent the other cavity 9.

Plates with thin-etched membranes require special etching processes and special handling during manufacture. From a production standpoint, it is more cost-effective to work membranes 5 out of the middle plate 8, since the processes for making the sensor element can also be used to make the membranes. Openings 7 in upper plate 3 and/or lower plate 2 make membranes 5 accessible for measurement of deflection or deformation. Further, the embodiment of the invention shown in FIG. 5 permits a desirable localization of non-tight connections or leaks.

Various changes are possible within the scope of the inventive concept. In particular, features of one embodiment may be combined with features of another embodiment.

We claim:

1. Method of making an acceleration sensor, comprising connecting together at least an upper plate (3) and a lower plate (2), and forming a cavity (4) between said plates, in such a way that at least one of said plates (2, 3) defines a membrane (5) which deforms in response to an internal pressure in said cavity, thereby facilitating immediate detection of any faulty connection between said plates.

2. Method of making an acceleration sensor, comprising connecting together at least an upper plate (24), a lower plate (21), and at least one intermediate plate (22, 23), and forming a cavity (26, 27) between said plates, in such a way that at least one of said plates (22,23) defines a membrane (5) which deforms in response to an internal pressure in said cavity, and forming respective openings (7) adjacent each membrane (5), so that all of said membranes (5) are accessible from outside.

3. Method according to claim 1, further comprising forming said cavity (4) adjacent multiple plates.

4. Method according to claim 1, further comprising providing a sensor element (1) inside said cavity (4).

5. Method according to claim 1, comprising forming at least two of said cavities (4), of which merely a portion have a membrane, and providing sensor elements (1) in a portion without any membrane.

6. Method according to claim 1, wherein said plates are processed by masking and etching steps.

7. Method according to claim 1, comprising providing an intermediate plate (8) between said lower plate (2) and said upper plate (3), and forming said sensor element (1) from said intermediate plate.

8. Method according to claim 7, comprising forming at least one further cavity (9), and forming a membrane (5) in said intermediate plate (8) adjacent said at least one further cavity (9).

* * * * *